March 17, 1931. M. B. SHAFER 1,797,159
COW STANCHION AND STALL
Filed April 9, 1930 2 Sheets-Sheet 1
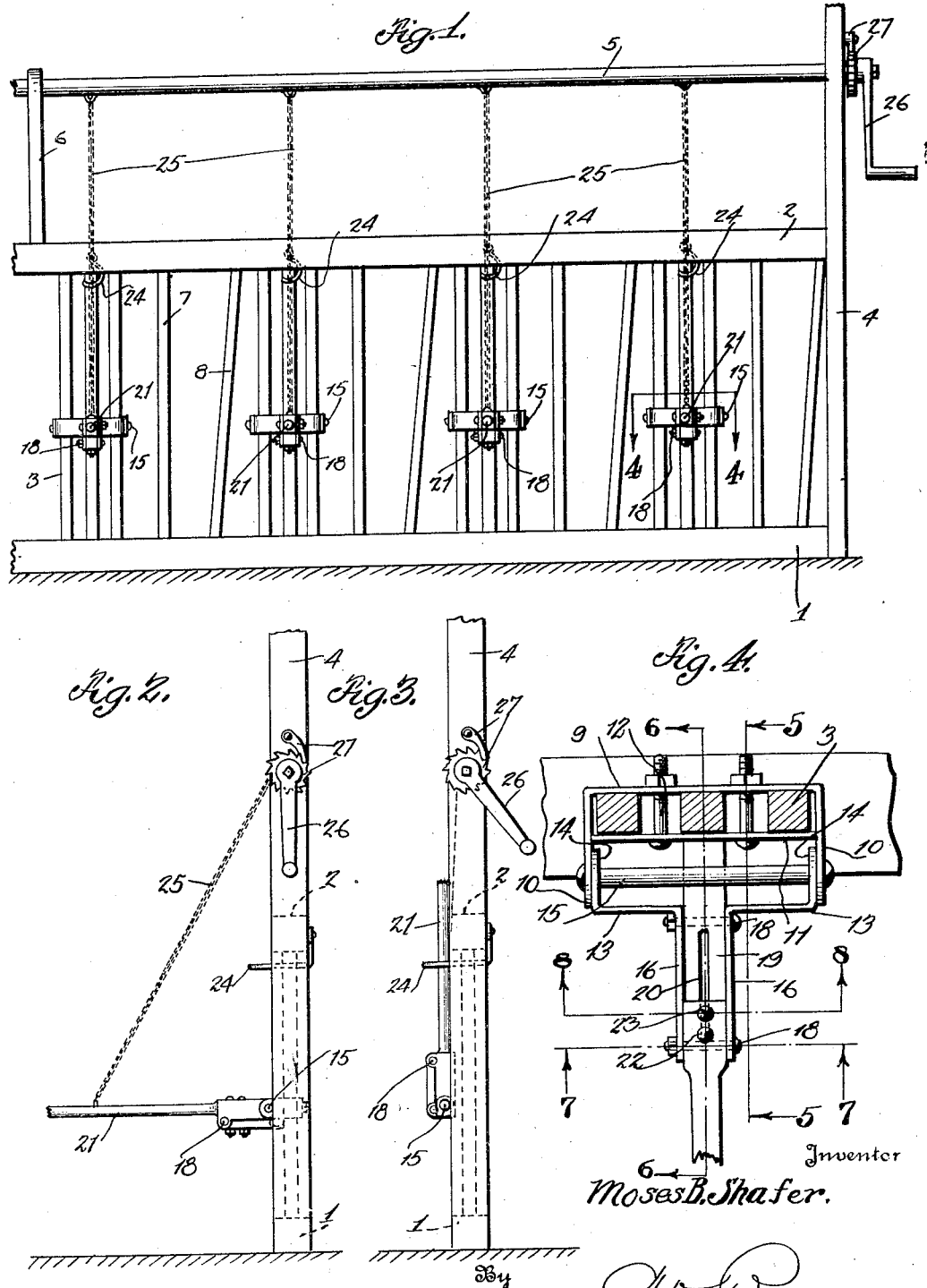
Inventor
Moses B. Shafer.

March 17, 1931.  M. B. SHAFER  1,797,159
COW STANCHION AND STALL
Filed April 9, 1930  2 Sheets-Sheet 2
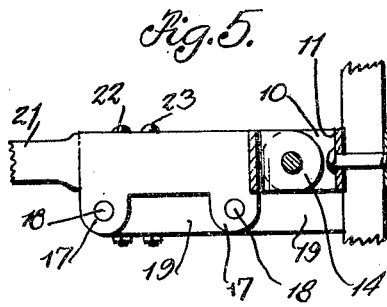
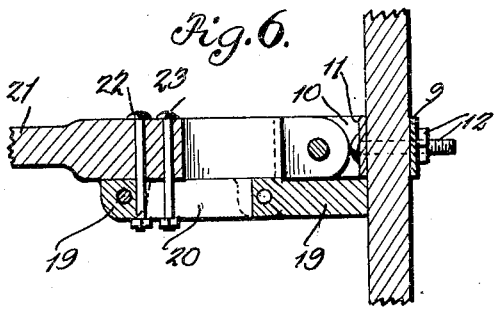
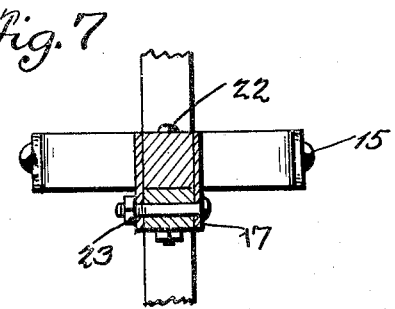
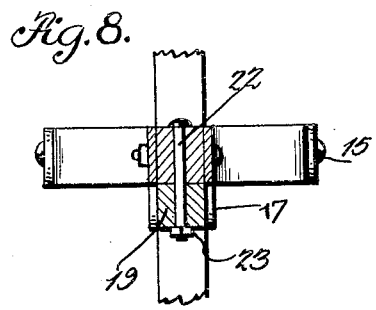
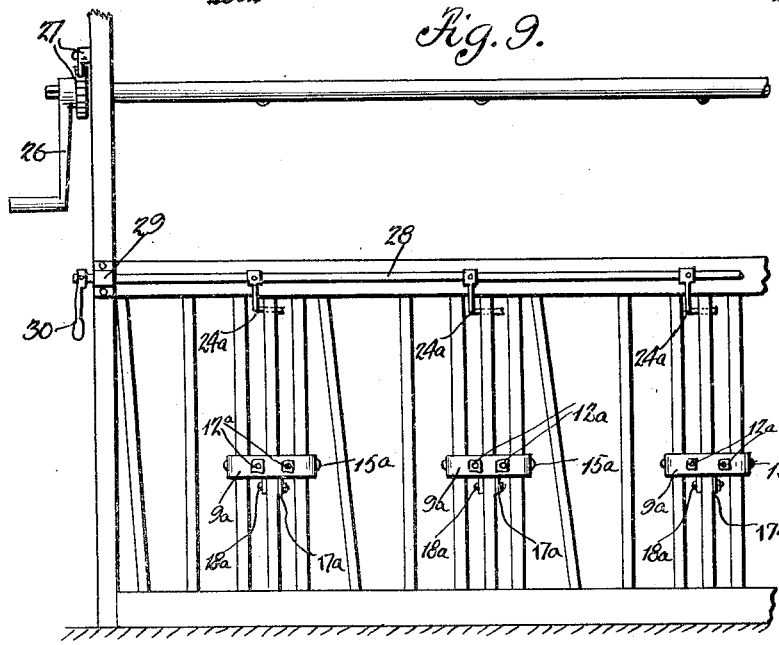
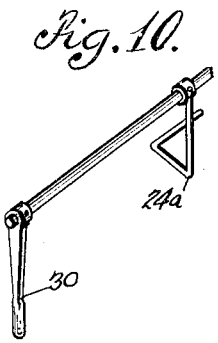
Inventor
Moses B. Shafer.

Patented Mar. 17, 1931

1,797,159

UNITED STATES PATENT OFFICE

MOSES B. SHAFER, OF ARKPORT, NEW YORK

COW STANCHION AND STALL

Application filed April 9, 1930. Serial No. 442,904.

This invention relates to certain new and useful improvements in cow stanchion and stall.

The primary object of the invention is to provide a cow stanchion and stall wherein the stall is comprised of vertically swinging partition bars carried by the stanchion frame which may be raised while the cows are being secured to the stanchions and thereafter lowered to provide spaced partition or stall bars for separating the cows, the bars being also raised when the cows are to be released from the stanchions to permit the cows to turn in the stalls and walk forwardly therefrom in passing over the drain gutter rearwardly of the stanchion frame to eliminate slipping, falling and injury to the cows in passing from the stalls.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary front elevational view of a cow stanchion and stall constructed in accordance with the present invention;

Figure 2 is an end elevational view showing the partition stall bars lowered to horizontal positions;

Figure 3 is an end elevational view, similar to Figure 2 showing the stall bars raised to vertical positions;

Figure 4 is a horizontal sectional view taken on line 4—4 of Figure 1 showing the hinge connection between one of the stall bars and the stanchion frame;

Figure 5 is a detail sectional view taken on line 5—5 of Figure 4;

Figure 6 is a detail sectional view taken on line 6—6 of Figure 4 showing the adjustable bolt and slot connection for the stall bar;

Figure 7 is a detail sectional view taken on line 7—7 of Figure 4;

Figure 8 is a detail sectional view taken on line 8—8 of Figure 4;

Figure 9 is a fragmentary rear elevational view of the stanchion frame showing a manually operable device for simultaneously releasing from vertical position, the several stall bars; and Figure 10 is a fragmentary perspective view of the stall bar releasing device shown in Figure 9.

Referring more in detail to the accompanying drawings, there is illustrated a cow stanchion and adjustable stall bar construction embodying a stanchion frame having a base rail 1, and a head rail 2 connected by frame rails 3 vertically arranged and disposed adjacent each other as shown in Figure 1, each end of the stanchion frame having a vertical standard 4, extending upwardly from the base rail 1 to a point above the head rail 2, with a longitudinal shaft 5 journalled therein and further supported intermediate its ends in bearings 6 extending upwardly from the head rail. The frame rails 3 are arranged in groups, each embodying three rails spaced from each other with the space between the groups receiving the vertical stanchion bars 7 and 8, the latter being movably mounted as indicated by the angular disposition thereof in Figure 1.

After the cows have been placed in retained positions, by the stanchion bars 7 and 8, hingedly mounted stall bars are lowered from vertical to horizontal positions to separate the cows. The hinge mounting for each stall bar as shown in Figs. 4 to 8 includes a U-shaped strap iron vertically adjustable upon each group of frame rails 3, the closed side 9 of the strap iron being positioned rearwardly of the frame rails 3 and having angle enclosing ends 10 projecting forwardly thereof. A bar 11 is engaged with the forward sides of the frame rails 3 and together with the strap iron is anchored to the frame rails by the bolt and nut devices 12 engaged with the strap iron and bar 11 between the rails 3. The cooperating hinge member comprises a pair of angle irons 13 having end ears 14 mating with the angle irons 10 of the strap iron with a bolt or pin 15 extended through these parts to form the hinge connection. Spaced side arms 16 project outwardly from the angle irons 13 in parallel relation and carry depending ears 17 at each corner through which bolts 18 pass in anchoring the block 19 thereto, the block being vertically and longitudinally slotted as at 20 for a portion of its length adjacent the outer end while the inner end thereof extends inwardly a distance to abut the middle one of the group of three frame bars to constitute a stop when the hinge member is horizontally disposed, as shown in Figures 5 and 6. A stall bar 21 is adjustably mounted at its inner end upon the block 19 between the side arms 16, the adjustment being accomplished by screw bolts 22 carried by the stall bar 21 and depending through the slotted opening 20 in the block 19 with binding nuts 23 threaded upon the lower ends thereof to be moved into engagement with the lower side of the block, this arrangement being clearly shown in Figures 6 and 8.

The stall bars 21 may be individually and manually raised upon the hinged pin 15 and when perpendicularly disposed are so retained by the spring arm 24 carried by the head rail 2 as shown in Figure 3. The stall bars 21 may be simultaneously raised by the shaft 5, each stall bar having a chain connection 25 with the shaft 5 which in turn is operated at one end by the crank handle 26 with which a pawl and ratchet device 27 is associated.

After the cows have been placed in retained positions by the stanchion bars 7 and 8, the stall bars 21 are lowered to separate them, the stall bars in this form of the invention being individually lowered by manually releasing the spring arm 24 and the pawl and ratchet devices. When leaving the stanchion, the stall bars are first raised to vertical positions and the cows released from the stanchion bars at which time, the cows may turn in the stalls and walk forwardly therefrom as difficulty and injury to the cows is frequently experienced in causing them to move backwardly away from the stanchion frame, while passing over a drain gutter.

In another form of the invention as disclosed in Figs. 9 and 10, the spring arms 24a are simultaneously released from the stall bars, the spring arms 24a being carried by the shaft 28 journaled as at 29 upon the head bar 2 with an operating handle 30 upon one end thereof, the spring arms 24a being swung upwardly for disengagement from the free ends of the stall bars.

From the above detailed description of the invention it is believed that the construction and operation will at once be apparent and while there are herein shown and described the preferred embodiments of the invention, it is nevertheless to be understood that minor changes may be made therein without departing from the spirit and scope of the invention as claimed.

I claim:—

1. In a cow stanchion and stall, a stanchion frame, stall bars hinged at one end to the frame, a suspension chain for holding the bars horizontally positioned, spring arms for holding the bars vertically positioned, and means for simultaneously releasing the spring arms from the bars.

2. In a cow stanchion and stall, a stanchion frame, stall bars hinged at one end to the frame, a suspension chain for holding the bars horizontally positioned, spring arms for holding the bars vertically positioned, means for simultaneously releasing the spring arms from the bars, including a journalled shaft on which the spring arms are mounted, and an operating crank for the shaft.

3. In a cow stanchion and stall, a stanchion frame, stall bars hinged at one end to the frame, means for holding the bars horizontally positioned, means for holding the bars vertically positioned, the hinged connection including strap members hinged together, means for adjustably clamping one of the strap members to the frame, an adjustable connection between the other strap member and the stall bar, including a supporting block on the last named strap member, and an adjustable connection between the block and stall bar.

4. In a cow stanchion and stall, a stanchion frame, stall bars hinged at one end to the frame, a suspension chain for holding the bars horizontally positioned, means for holding the bars vertically positioned, the hinged connection including strap members hinged together, means for adjustably clamping one of the strap members to the frame, an adjustable connection between the other strap member and the stall bar, including a supporting block on the last named strap member, and an adjustable connection between the block and stall bar.

5. In a cow stanchion and stall, a stanchion frame, stall bars hinged at one end to the frame, means for holding the bars horizontally positioned, means for holding the bars vertically positioned, the hinged connection including strap members hinged together, means for adjustably clamping one of the strap members to the frame, an adjustable connection between the other strap member and the stall bar, including a supporting block on the last named strap member with a vertical longitudinal slot therein, and a bolt connection between the stall bar and block extending through the block slot.

6. In a cow stanchion and stall, a stanchion frame, stall bars hinged at one end to the frame, a suspension chain for holding the bars horizontally positioned, means for holding the bars vertically positioned, the hinged connection including strap members hinged together, means for adjustably clamping one of the strap members to the frame, an adjustable connection between the other strap member and the stall bar, including a supporting block on the last named strap member with a vertical longitudinal slot therein, and a bolt connection between the stall bar and block extending through the block slot.

In testimony whereof I affix my signature.
MOSES B. SHAFER.